US005537582A

United States Patent [19]
Draeger

[11] Patent Number: 5,537,582
[45] Date of Patent: Jul. 16, 1996

[54] BUS INTERFACE CIRCUITRY FOR SYNCHRONIZING CENTRAL PROCESSORS RUNNING AT MULTIPLE CLOCK FREQUENCIES TO OTHER COMPUTER SYSTEM CIRCUITRY

[76] Inventor: Jeffrey S. Draeger, 1200 Creekside Dr., Apt. 1616, Folsom, Calif. 95630

[21] Appl. No.: 65,840

[22] Filed: May 21, 1993

[51] Int. Cl.⁶ .................................................. G06F 13/42
[52] U.S. Cl. .................. 395/550; 364/DIG 1; 364/271.1; 364/271.4
[58] Field of Search ............................................. 395/550

[56] References Cited

U.S. PATENT DOCUMENTS

| | | | |
|---|---|---|---|
| 5,235,698 | 8/1993 | Lan | 395/550 |
| 5,239,631 | 8/1993 | Boury et al. | 395/325 |
| 5,256,994 | 10/1993 | Langendorf | 331/16 |
| 5,263,172 | 11/1993 | Olnowich | 395/800 |
| 5,336,939 | 8/1994 | Eitrham et al. | 307/269 |
| 5,345,109 | 9/1994 | Mehta | 307/271 |
| 5,359,232 | 10/1994 | Eitrham et al. | 307/268 |
| 5,371,880 | 12/1994 | Bhattacharya | 395/550 |
| 5,388,250 | 2/1995 | Lewis et al. | 395/550 |

OTHER PUBLICATIONS

Burk Steven, Neal Boudette, "IBM shows tablet PC, compact desktop,", PC Week, Nov. 23, 1992, V9, n47, p. 14(1).
(No Author Given), "IBM demostrates 100 MHZ Blue Lightning", Microprocessor Report, Dec. 9, 1992, V6, n50, p. 5(1).

Burk Steven, "Cache to debut boards based on IBM' s SLC", PC Week, Dec. 14, 1992, v9, 4c n50, p. 31(1).

Spiegelman, Lisa L. "IBM 486 to challenge Intel' s grip;" Computer Reseller News, Nov. 2, 1992, n 498, p. 1(2).

Slater, Michael, "Multivendor 386/486 market burgeoning: steep price cuts follow . . ." Microprocessor Report, Jan. 25, 1993 v7, n1 p. 1 (9).

"Intel Clock–Doubler 486 Debuts as 486DX2, 486DX2 Aimed Primarily at OEMs–End–User Version to Follow", Michael Slater, *Microprocessor Report*, Mar. 4, 1992, pp. 19–21.

*Primary Examiner*—Kevin A. Kriess
*Assistant Examiner*—St. John Courtenay, III

[57] ABSTRACT

A central processing unit including apparatus for controlling transfer of data and addresses to and from the central processing unit including circuitry for synchronizing the transfer of data and addresses to and from the central processing unit for central processing units running at rate equal to an external system clock rate, for central processing units running at twice an external system clock rate, and for central processing units running at three times an external system clock rate.

38 Claims, 8 Drawing Sheets

INTERNAL CLOCK THREE TIMES EXTERNAL CLOCK

Generation of T2wait Signals With External Clock at 1/2 and 1/3 of Internal Clock 5,537,582

BUS INTERFACE CIRCUITRY FOR SYNCHRONIZING CENTRAL PROCESSORS RUNNING AT MULTIPLE CLOCK FREQUENCIES TO OTHER COMPUTER SYSTEM CIRCUITRY

BACKGROUND OF THE INVENTION

1. Field of the Invention This invention relates to computer systems and, more particularly, to methods and apparatus for increasing the speed of operation of a central processing unit used in such systems.

2. History of the Prior Art

Computers are capable of doing more work if they can process information faster. One way in which this may be accomplished is to run the central processing unit faster. As long as the circuitry can operate at a faster speed and the processes are capable of running at that speed, such an operation will produce more work.

A problem with running a central processing unit at a faster speed is that many of the components which function with the processor are not designed to run at such a speed. To redesign those components to run faster would be very expensive, time consuming, and would produce expensive components. Even though accomplished, it would be impossible to run such central processors with older components external to the processor. Consequently, it is desirable to run a central processing unit at a faster clock frequency than the clock frequency at which components of the computer external to that central processor are run. Running the central processing unit at a faster clock frequency may be accomplished by providing clock generating circuitry within the central processing unit which runs at a faster rate than does a system clock generating circuit. However, in order to run with such external components, the central processing unit must interface with the external components at a slower speed. It has been found possible to operate a central processor internally at a speed which is twice the speed at which external circuitry is designed to operate, yet allow the processor to interface at a slower rate for operations which involve external circuitry, and still increase the overall speed of operation of a computer significantly. This increase of overall speed occurs because a substantial amount of the actual processing may be accomplished by the processor without requiring it to receive or send data to external components. The i486 DX2 processors designed and manufactured by Intel Corporation of Santa Clara, Calif., accomplish this feat.

The success of computers utilizing these processors has suggested that further increases in the operational speed would be beneficial. However, since computer systems now exist which utilize central processors which function at an internal speed which is twice the speed of external components and other processors which function at the speed of external components, it is desirable that any circuitry used for interfacing and synchronizing be capable of interfacing and synchronizing any central processor running at the external clock rate, running at twice the external rate, and running at an even more rapid internal clock rate. Circuitry which allows this will greatly reduce the overall cost of the systems using different processors operating at the different clock speeds. This desirable feature creates an even greater interfacing problem.

SUMMARY OF THE INVENTION

It is, therefore, an object of the present invention to provide circuitry for allowing the increase of the processing speed of central processing units without affecting the processing speed of components external to the processor.

It is another, more specific, object of the present invention to provide a bus interface circuit which allows the speed of operation of a central processing unit be the same as, twice the speed of, or three times the clock speed at which external components utilized with the processor are operated.

These and other objects of the present invention are realized in a bus interface unit which allows the synchronization of central processors to external components only at the speed of operation of the clock of the external components. Such an interface unit allows components of the computer system external to the processor to run at their ordinary speeds even though the processor may be operating at clock speeds of twice or three times that speed.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art.

The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION OF THE INVENTION

Figure 1:
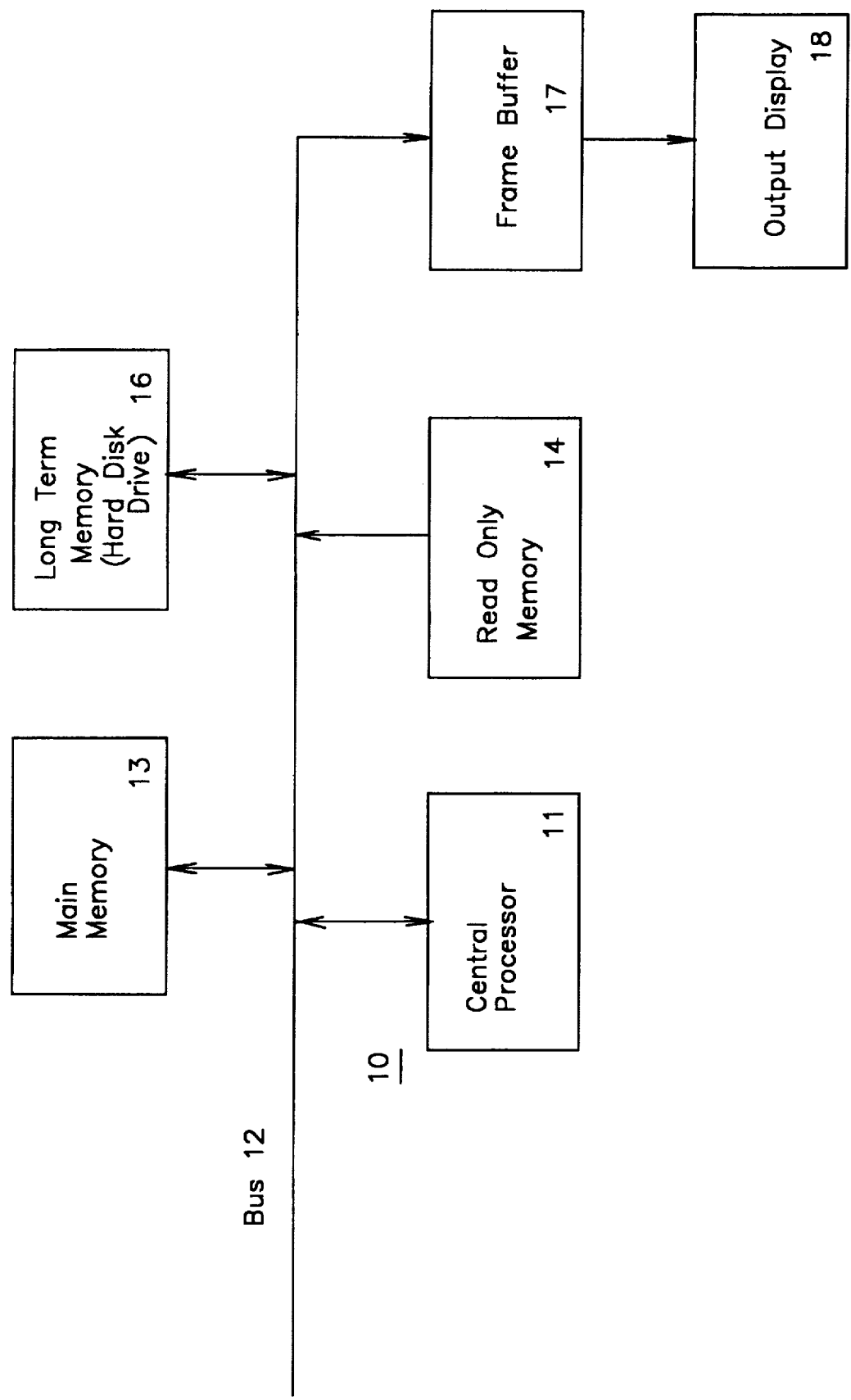
FIG. 1 is a block diagram illustrating a computer system including the present invention.

Referring now to FIG. 1, there is illustrated a computer system 10. The system 10 includes a central processor 11 which carries out the various instructions provided to the computer 10 for its operations. The central processor 11 is joined to a bus 12 adapted to carry information to various components of the system 10. Joined to the bus 12 is main memory 13 which is typically constructed of dynamic random access memory arranged in a manner well known to those skilled in the prior art to store information during the period in which power is provided to the system 10. Also joined to the bus 12 is read only memory 14 which may include various memory devices such as EPROM devices well known to those skilled in the art which are adapted to retain a memory condition in the absence of power to the system 10. The read only memory 14 typically stores various basic functions used by the processor 11 such as basic input output processes and startup processes. Also connected to the bus 12 are various peripheral components such as long term memory 16 (typically electro-mechanical hard disk drives).

Also joined to the bus 12 is circuitry such as a frame buffer 17 to which data may be written which is to be transferred to an output device such as a monitor 18 for display. The construction and operation of these various elements of circuitry are well known to those skilled in the art.

Figure 2:
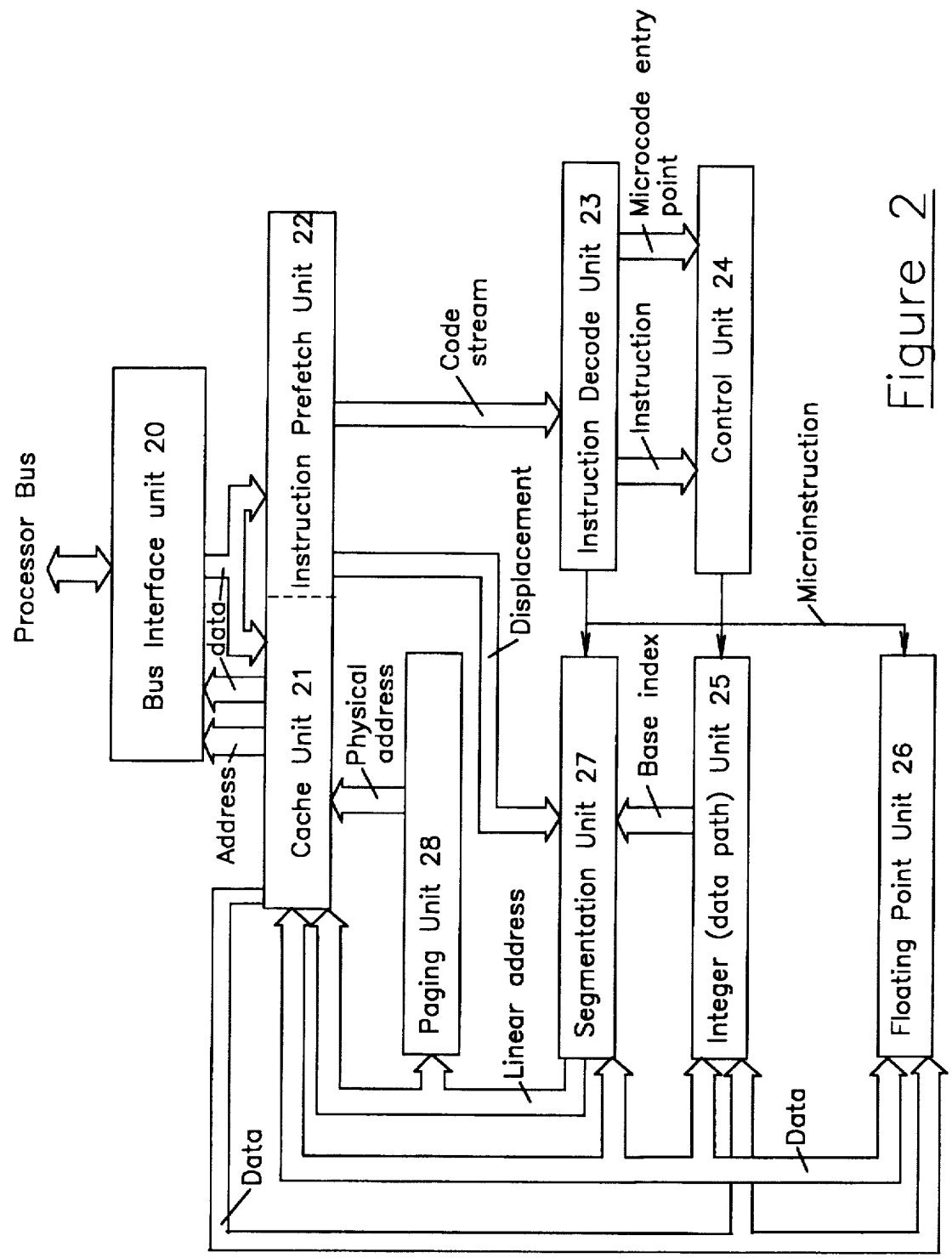
FIG. 2 is another block diagram illustrating in general the design of a central processing unit used in FIG. 1.

FIG. 2 is a block diagram illustrating a central processing unit 11 which may include circuitry constructed in accordance with the present invention to both increase the speed of operation and to allow the use of external circuitry designed to operate at speeds slower than the internal speed of the central processing unit. The central processing unit 11 includes those components which are typical of an Intel i486 processing unit. Among these are a bus interface unit 20, a cache unit 21, an instruction prefetch unit 22, an instruction decode unit 23, a control unit 24, an integer (data path) unit 25, a floating point unit 26, a segmentation unit 27, and a paging unit 28.

The bus interface unit 20 is connected by a processor bus to a system bus on which data and addresses are provided and to which data and addresses are furnished. The bus interface unit 20 coordinates data transfers, instruction prefetches, and control functions between the processor's internal units and the other components of the computer system. Within the processor 11, the bus interface unit 20 communicates with the cache unit 21 and the instruction prefetch unit 22 through three individual buses. A detailed description of the bus interface unit is given in a publication entitled i486 MICROPROCESSOR Hardware Reference Manual, pp. 3-1 through 3-67, published 1990 by Intel Corporation, Santa Clara, Calif.

The cache unit 21 stores copies of recently read instructions, operands, and other data. When the processor 11 requests information already in the cache unit 21, no processor bus cycle is required. This allows the processor 11 to run instructions without requiring the very long times necessary for external memory accesses. The instruction prefetch unit 22 uses the bus interface unit 20 to prefetch instructions from memory 16 when the bus interface unit 20 is not otherwise performing bus cycles to execute another instruction. By reading instructions before they are needed, the processor 11 rarely needs to wait for an instruction prefetch cycle on the processor bus. The instruction decode unit 23 receives instructions from the instruction prefetch unit 22 and translates them into low level signals and microcode entry points usually at the rate of one instruction per clock cycle. The control unit 24 interprets the instruction word and micro code entry points received from the instruction decode unit. The control unit 24 controls the integer and floating point processing units 25 and 26 and provides control signals to the segmentation unit 27. The integer unit 25 identifies where data is stored and performs all of the arithmetic and logical functions available in the instruction set of the processor 11. The floating point unit 26 is a processor which executes various mathematical operations. The segmentation unit 27 allows the use of segments, protected independent address spaces. The segmentation unit 27 translates a segmented address issued by a program into an unsegmented address. The paging unit 28 allows the addressing of spaces larger than those physically available within the main memory 16 of the computer system.

Figure 3:
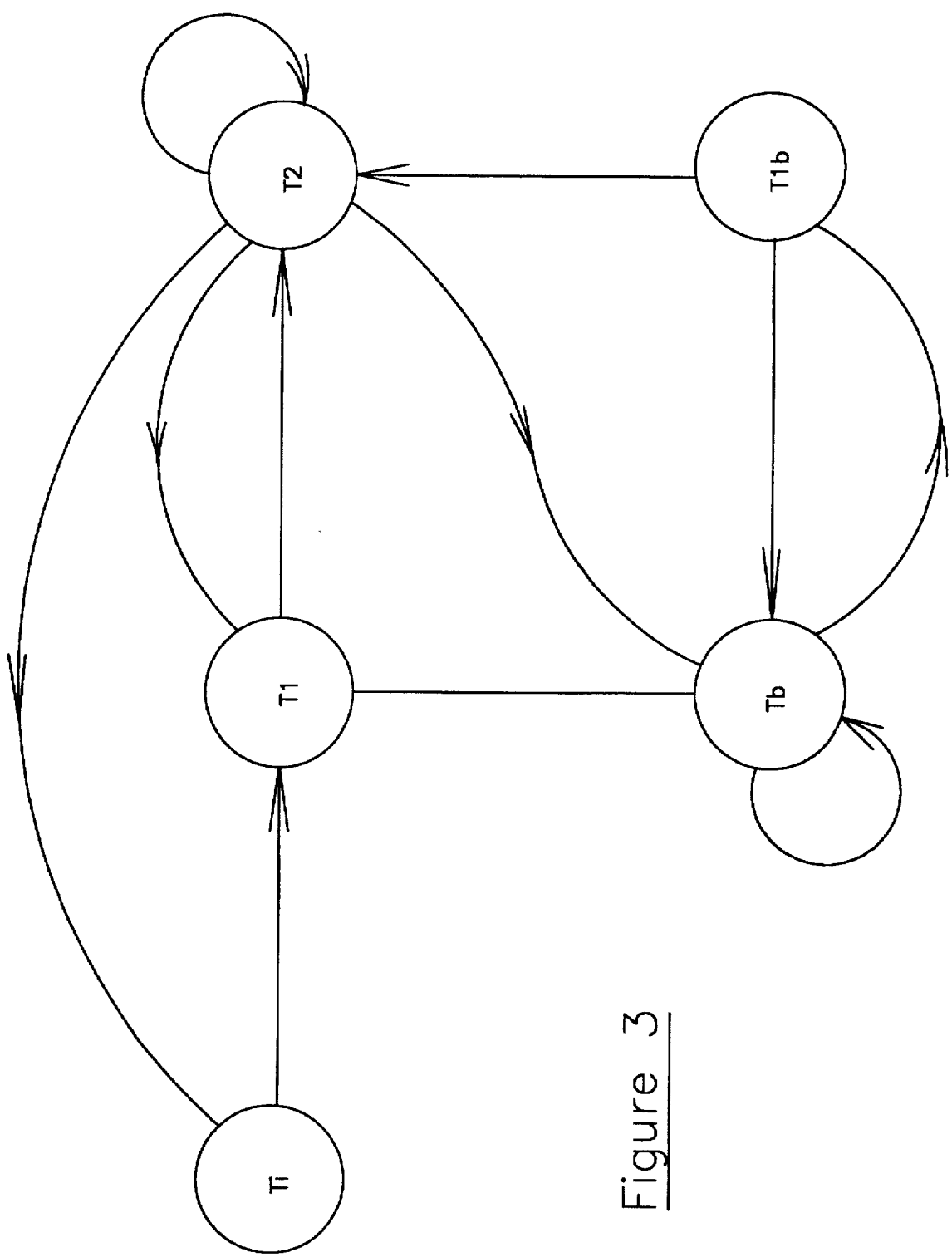
FIG. 3 is a state diagram useful in demonstrating the operation of the present invention.

FIG. 3 is a state diagram useful in describing the operation of the present invention. The state diagram represents the various states in which the processor bus interface unit 20 may operate. The processor bus interface unit 20 controls the operations of the processor bus. Typically, the processor bus is connected to one or more system buses such as the bus 12 illustrated in FIG. 1. As is illustrated in FIG. 3, the bus interface unit 20 may operate in five different states. The bus assumes a state Ti (idle) when it is in no other state of operation. In this state, the bus interface unit 20 does nothing; and the processor 11 is not using the processor bus to send to or receive from the circuitry of the computer system external to the central processor 11. From Ti, the bus interface unit 20 moves to a T1 state in response to any request from the processor 11. In the T1 state, the bus interface unit 20 places the addresses generated by the processor 11 on the processor bus for transfer to the external busing system. From the T1 state, the bus interface unit 20 may move either to a T2 state or to a Tb (backoff) state. The Tb (backoff) state is provided in the i486 processors manufactured by Intel Corporation as a state in which an operation of the processor 11 is immediately aborted in response to an external signal lxbo. The interface unit may move to the Tb state from any of its internal states and does this in response to the external backoff signal appearing on a backoff pin to the processor 11; the external backoff signal causes the generation of an internal signal lxbo. In this Tb state, the processor 11 immediately relinquishes the bus. From the backoff state, the bus interface unit 20 moves to the T1b state. The T1b state is essentially the same as the T1 state and allows the bus unit to recover from a backoff state. In the T1 and the T1b states, addresses are asserted on the external bus. After one full external clock period, the bus interface unit 20 from either the T1 or the T1 b states, the bus interface unit 20 moves to the T2 state. In the T2 state, data is written or read using the processor bus and the state terminates.

In the basic i486 processor, each state of the bus interface unit 20 may take one clock cycle of the processor 11. For Intel i486 DX2 processors, the processor 11 runs on an internal clock at twice the frequency of the external clock used for the rest of the computer system (called "external components"). Consequently, these processors provide circuitry by which operations of the processor 11 appear to the external components to operate at the same clock frequency as the remainder of the computer system. Thus, in general, signals from the external circuitry used by the processor 11 are only accepted at the clock frequency of the external circuitry; and signals being transferred to the external components over the processor bus by the processor 11 must only be transferred appropriately synchronized to the external clock.

In order to provide a new bus interface unit 20 capable of operating with processors operating at the external clock rate, with processors operating at twice the external clock rate, and with processors operating at three times the external clock rate, it is necessary to provide bus interface circuitry capable of synchronizing internal processor signals occurring at all of these clock frequencies to the external clock frequency. This allows a single unit to be used with processors which function at the same frequency as the external clock, with processors which function at twice the frequency of the external clock, and with processors which function at three times the frequency of the external clock. A single unit is much less expensive than would be multiple units for each of the different processors.

Figure 4:
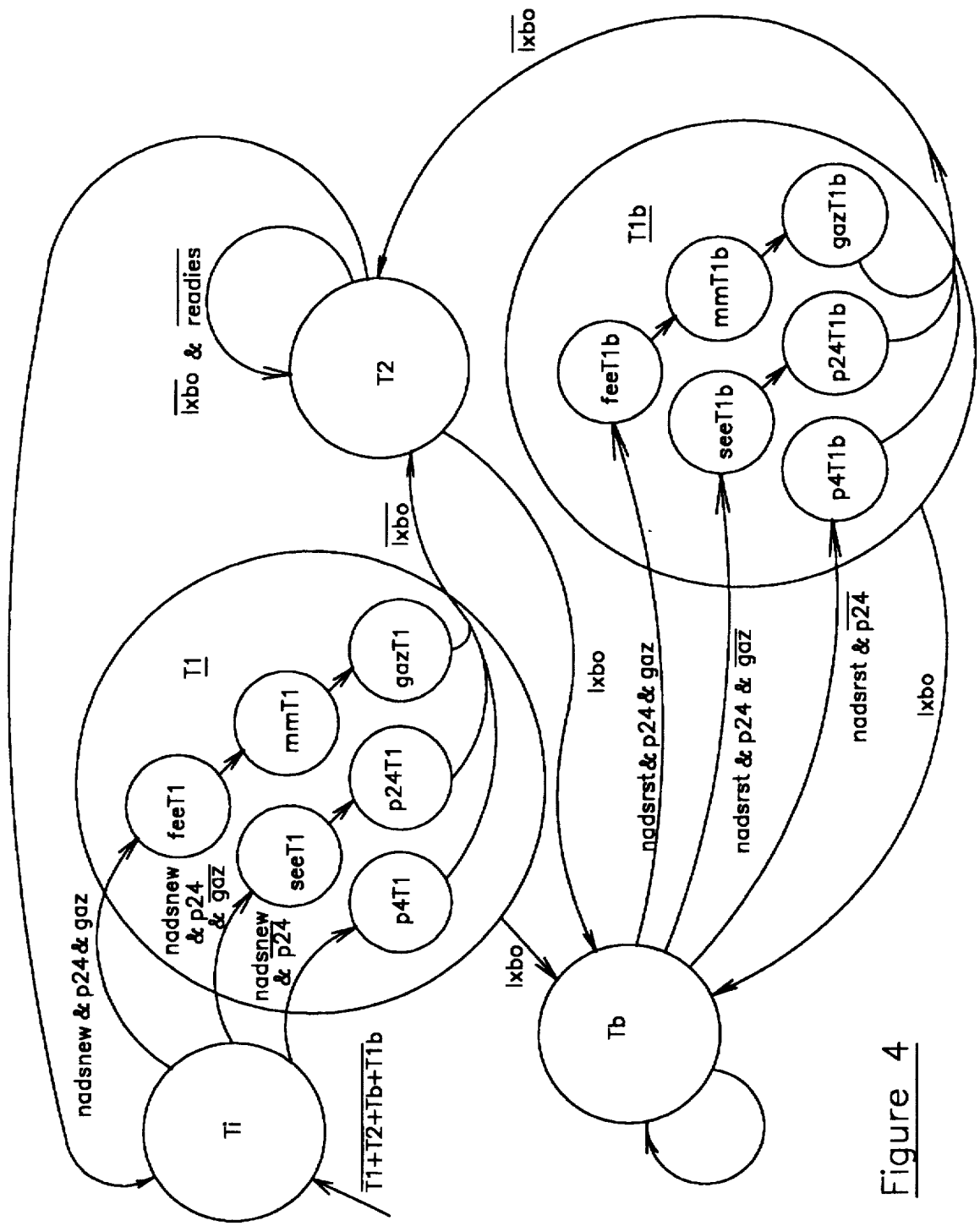
FIG. 4 is a more detailed state diagram useful in demonstrating the operation of the present invention.

FIG. 4 depicts a more detailed state diagram illustrating the operation of the bus interface unit 20 of the present invention. The state diagram of FIG. 4 includes the same states as those illustrated in FIG. 3. However, certain of those states have been enlarged in order to encompass operations performed by processors running at twice and three times the speed of the basic external clock of the computer system. In addition, various control signals are furnished which control the time at which transitions between the various states may occur. These signals assure that all of the operations which occur on the processor bus take place only at the clock frequency of the external components whether the processor 11 is running at the external clock frequency, at twice that clock frequency, or at three times that frequency.

As is shown in FIG. 4, the state machine of the bus interface unit 20 includes the same five states Ti, T1, T2, Tb, and T1b as did the state machine illustrated in FIG. 3. However, certain of these states have been enhanced in the present invention in order to allow the bus interface unit 20 to function with processors which run at the same clock speed as the external components, with processors which run at twice the clock speed of the external components, and with processors which run at three times the clock speed of the external components. In order to accomplish this, certain of the states now include a number of different substates which are entered when operating with different clock speeds. For example, as with the earlier state machine, the state machine illustrated in FIG. 4 enters the Ti or idle state in any case in which it is in none of the other states of operation. The state machine moves from the Ti state in response to three different combinations of signals. First, a Nadsnew signal and an inverted P24 signal together cause the state machine to move to P4T1 substate. The P4T1 substate represents the T1 state when operating with a processor 11 which functions at the same clock as the clock used by the external components. The P24 signal indicates that the processor 11 is using neither a clock which is twice the external clock nor a clock which is three times the external clock. This means to the state machine that the two clocks are the same and need only be synchronized. The Nadsnew signal is a new address strobe signal which is gated by a DClutch signal which appears constantly when the processor 11 functions at the same rate as the external clock.

When the processor 11 is operating with an internal clock which is twice or three times the external clock rate, the DClutch signal functions as a mask to allow the generation of the Nadsnew signal only on every second or third internal clock during a period in which the internal clock is in synchronization with the external clock. The DClutch signal is active in the preferred embodiment from the leading edge of phase 2 of the last internal clock cycle occurring during an external clock cycle until the leading edge of the first phase 2 occurring during a next external clock cycle. This essentially allows addresses to be placed on the bus interface unit 20 bus and thus on the external address bus only at the leading edge of an external clock cycle and thus in synchronization with the external clock.

As may be seen in FIG. 4, the state machine moves from the Ti state in response to the combined presence of a P24 signal and the Nadsnew signal, and the absence of a GAZ signal. The P24 signal indicates one of the two faster processor clocks while the absence of the GAZ signal indicates the clock is not the three times clock. This combination of signals causes the state machine to move to a seeT1 state at which addresses are placed on the bus. From the seeT1 state, the state machine moves to a P24T1 state after the passing of a single internal clock period. Thus, when the processor clock is twice the external clock, the state machine passes through two states each of which requires one internal clock period.

In a similar manner, the state machine moves from the Ti state to a feeT1 state in response to the combined presence of the Nadsnew signal, the P24 signal, and the GAZ signal. These indicate the appropriate synchronization with the external clock on every third internal clock, that the processor 11 is operating at one of the higher internal speeds, and that the processor 11 is operating at three times the external clock rate. The state machine moves from the feeT1 substate at which addresses are placed on the bus to a substate mmT1 after one internal clock and then to a gazT1 substate after a second internal clock.

Thus, the T1 state is modified in the present invention so that it provides three separate paths for processors operating at each of the three possible internal clock rates.

The state machine of the present invention moves from the one of the three substates P4T1, P24T1, or gazT1 on the next internal clock. If no backoff signal is present, the state machine moves to the T2 state. If a backoff signal is present, the state machine moves to the Tb state. The state machine remains in the Tb state until the backoff signal is removed. From the backoff state, the state machine moves to the T1b state. The T1b state is essentially the same as the T1 state in that it provides three paths for operation depending on the internal clock rate at which the processor 11 is operating. The state machine moves to a P4T1b state in response to a Nadsrst signal when the signal P24 is absent. The Nadsrst is essentially the same signal as the Nadsnew signal and is gated by the DClutch signal to provide an appropriate window for the particular internal clock. Thus, the state machine moves to the P4T1b state when the internal clock is equal to the external clock. The state machine moves to a substate secT1b in response to the presence of the Nadsrst and P24 signals and the absence of the GAZ signal. Thus the state machine moves to the substate sect 1 b on a signal gated every other internal clock period when a higher internal clock is present but that clock is not the three times clock. The state machine moves from the substate secT1 to a substate P24T1b in response to the next internal clock. The state machine moves to a substate feeT1b in response to the presence of the Nadsrst, P24 signals, and the GAZ signal. Thus the state machine moves to the substate feeT1b on a signal gated every third internal clock period when a higher internal clock is present and that clock is the three times clock. The state machine moves from the substate feeT1 to a substate mmT1b in response to the next internal clock and to a substate gazT1b in response to the next internal clock.

Similar to the T1 state, the addresses are placed on the external bus during each of the substates P4T1b, seeT1b, and feeT1b. Also similar to the T1 state, the state machine of the present invention moves from the one of the three substates P4T1b, P24T1, or gazT1b on the next internal clock. If no backoff signal is present, the state machine moves to the T2 state. If a backoff signal is present, the state machine moves to the Tb state.

Thus, as may be seen, the state machine of the present invention provides in each of the three different paths available in each of the T1 and T1b states that the state machine remains in the particular state for an amount of time which is equal to one clock period of the external clock whatever the internal clock may be. Thus, if the internal clock is at three times the external clock, the state machine remains in the substates feeT1, mmT1, and gazT1 (or feeT1b, mmT1b, and gazT1b) for three internal clock periods which together equal one external clock period. Similarly, if the internal clock is at twice the external clock, the state machine remains in the substates seeT1 and P24T1 (or seeT1b and P24T1 b) for two internal clock periods which together equal one external clock period.

From either of the T1 or the T1b states, the state machine of the present invention moves to the T2 state in the absence of a backoff signal. Although only a single state is illustrated in FIG. 4 to represent the state T2, the state machine remains in the T2 state in which writes to the system bus and reads from the system bus are accomplished until the read or the write operation occurs and then the state terminates. The occurrence or the read or write operation and the termination of the T2 state can only occur upon the receipt of signals which, like the DClutch signal, are gated to provide a window which is in synchronization with the external clock. To accomplish each of the various operation possible in the T2 state, one of a number of different ready signals is sent to the processor 11 when the data is ready. For example, to read data sent to the processor 11 on the external bus, the data must be ready for the processor 11. When the data is ready to be read, one of the ready signals is sent to the processor 11. The synchronization with the external circuitry is accomplished by masking these ready signals returned to indicate to the processor 11 that the data requested on a read from some memory position is ready to be used by the processor 11. The masking is accomplished by a T2wait signal which is gated in a manner similar to the manner in which the DClutch signal is produced. The T2wait signal is active in the preferred embodiment from the leading edge of phase 2 of the last internal clock cycle occurring during an external clock cycle until the leading edge of the first phase 2 of the internal clock cycle occurring during a next external clock cycle. The T2wait signal is necessary for the receipt of any of the ready signals. Since the T2wait signal is synchronized to allow the receipt of ready signals only in synchronization with the rising edge of the external clock, the external data can only be received in synchronization with that external clock no matter whether the internal clock is operating at the same speed as the external clock, at twice that speed, or at three times that speed.

Figure 5:
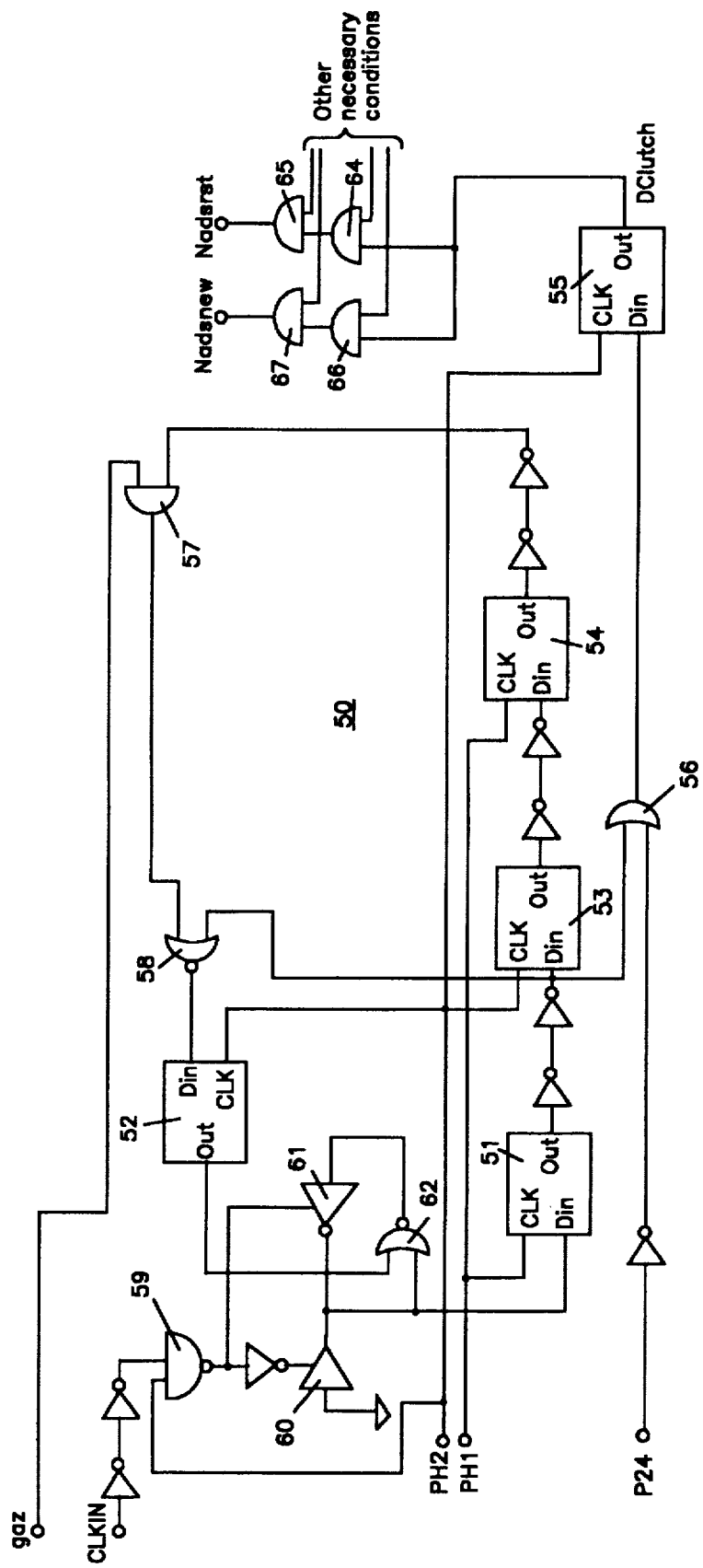
FIG. 5 is a circuit diagram illustrating details of circuitry for providing certain of the signals illustrated in the state diagram of FIG. 3.

FIG. 5 is a circuit diagram illustrating details of the circuitry used in the state machine of the present invention for producing the DClutch signals referred to above. The circuit 50 illustrated includes a series of D latches 51–54 which function to provide delays of either one internal clock period or two internal clock periods depending on whether the processor 11 is functioning at twice or three times the external clock rate. The DClutch output signal is provided by another D latch 55. The D latch 55 receives input from an OR gate 56 and is clocked by phase 2 of the internal processor clock. The OR gate 56 receives input signals from the output of the D latch 51 and the inverted input from an external signal P24. The high condition of the signal P24 indicates that the processor 11 is functioning at one of the two higher internal clock rates. Consequently, if the signal P24 is low indicating that the internal clock rate is the same as the external clock rate, the input furnished to the latch 55 is always high and the output of the latch 55 is always a one. This means that the operations of the T1 and T1b states can always take place without any masking of the internal clock.

When the processor 11 is functioning at an internal clock rate equal to twice the external clock rate, an external GAZ signal is low and the P24 signal is high. The low GAZ signal at the input to an AND gate 57 causes that AND gate 57 to produce a constant low or zero output. This zero value is furnished at one input to a NOR gate 58 and causes that NOR gate 58 to furnish the inverse of whatever is provided at its other input terminal at its output terminal. When the processor 11 is operating with an internal clock rate which is twice the external clock rate, the input of the D latch 51 is furnished to the NOR gate 58, inverted and furnished to the input of the D latch 52. The D latch 51 is clocked by phase 1 of the internal clock while the D latch 52 is clocked by phase 2 of the internal clock. Consequently, when the processor 11 is operating with an internal clock rate which is twice the external clock rate, a signal appearing at the input to the latch 51 is inverted and appears at the output of the latch 52 one full internal clock period later.

In order to synchronize the signal at the input to the latch 51 with the external clock rate, a signal CLKIN which is high just before the beginning of the external clock is provided to one input terminal of an AND gate 59. The other terminal of the AND gate 59 receives the phase 2 internal clock. When both these signals are high which can occur only just before the leading edge of the external clock, the output of the AND gate 59 enables a tristate device 60 to place a low value (zero) at the input to the D latch 51. When the phase 2 internal clock goes low and until the simultaneous appearance of high values for the phase 2 internal clock and the CLKIN signal, the tristate device 60 remains tristated and a tristate inverter 61 is enabled. During this condition of the tristate inverter 60, the inverter 61 and a NOR gate 62 transfer the output of the latch 52 to the input of the latch 51 as a value called DCALIGN.

Figure 7:
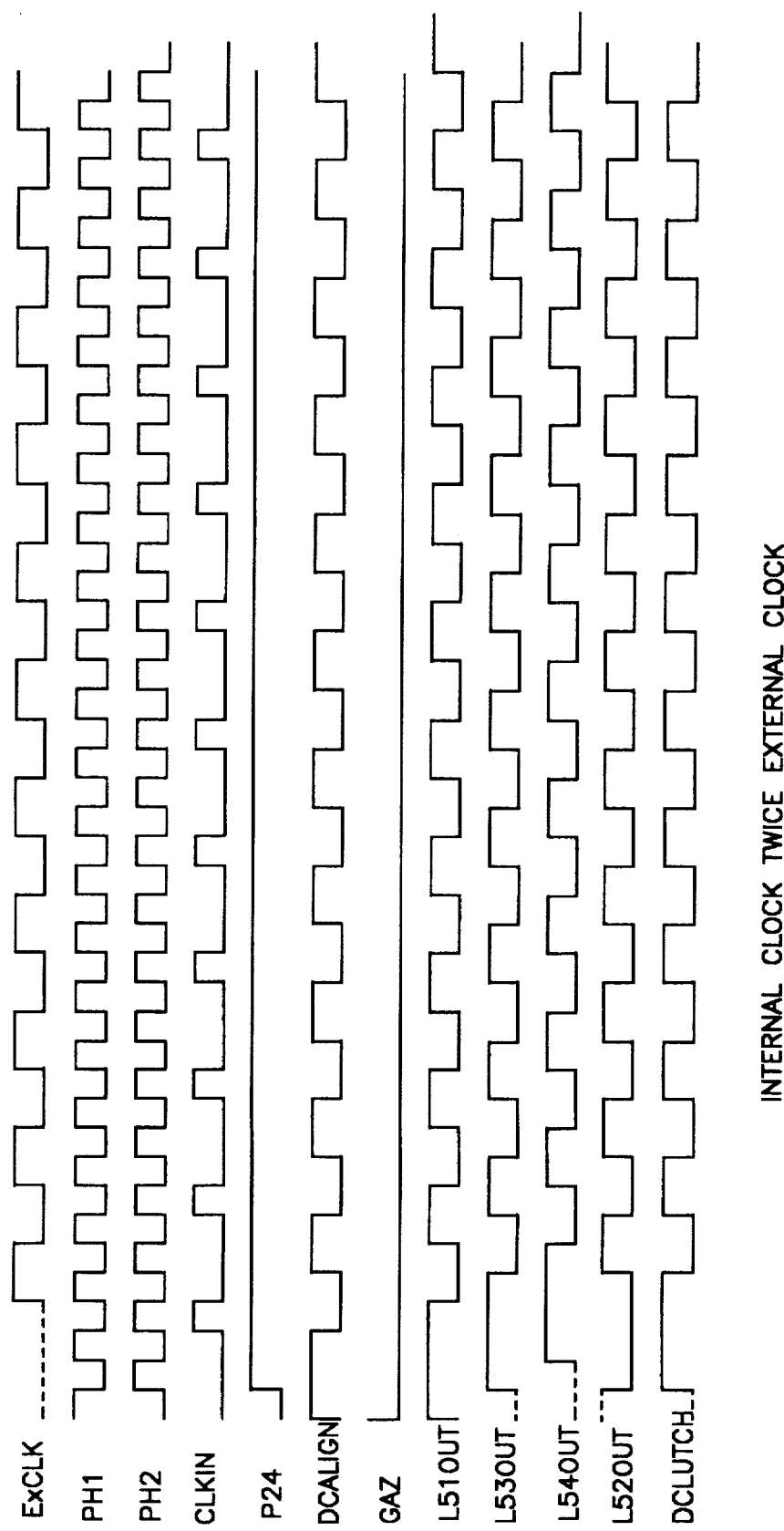
FIG. 7 is a timing diagram illustrating signals utilized in the operation of the present invention.

Thus, the DCALIGN signal produced is low when phase 2 of the internal clock is high at the same time as the CLKIN signal is high, and then follows the DCALIGN produced one full internal clock before. This value is shown in the timing diagrams in FIG. 7. As may be seen, the latch 51 is enabled by the leading edge of the phase 1 internal clock while the latch 52 is enabled by the leading edge of the phase 2 internal clock. Thus the output of each latch 51 and 52 is constant for one full internal clock period. With an internal clock rate of twice the external clock rate, presuming that the latch 51 is in the high condition when the signal DCALIGN goes low due to the coincidence of the CLKIN signal and the rising edge of the PH2 internal clock, the output of the latch 51 remains high until the next rising edge of the phase 1 clock and then goes low. Since the latch 51 produced a high output, this value was inverted by the NOR gate 58 and placed the latch 52 in the low condition at the rising edge of the preceding phase 2 clock. Thus the DCALIGN signal which mirrors the condition of the output of the latch 52 remains low for the next half phase of the internal clock. When the output of the latch 51 then goes low, a high value is placed at the input; and on the next rising edge of the phase 2 internal clock, the latch 52 output goes high. Thus, with a processor running at twice the external clock rate, a DCALIGN signal as shown in FIG. 7 is produced.

The output of the latch 51 is always furnished to the OR gate 56. When the processor 11 is operating with an internal clock rate which is twice or three times the external clock rate, the OR gate 56 receives a constant low value from the inverted P24 signal so it transfers the value at the output of the latch 51 to the input of the D latch 55 which produces the signal DClutch. As may be seen, the output DClutch signal produced creates a window (a high value) which appears only during the first half of the external clock when the internal clock rate is twice that of the external clock. It is at this time only that addresses may be placed on the processor bus by the bus interface unit 20. The DClutch signal which is the output of the latch 55 is transferred to an AND gate 66. The output of this AND gate 66 is furnished as an input signal to another AND gate 67 the output of which is the Nadsnew signal. As described with respect to FIG. 4, the Nadsnew signal is the signal utilized to allow the transfer from the Ti state to the T1 state and determines the time at which addresses are placed on the processor bus by the bus interface unit 20.

In a similar manner, the DClutch signal is also transferred to an AND gate 64 and to another AND gate 65 to produced the Nadsrst signal necessary for transferring from the Tb state to the T1b state and to initiate the transfer of addresses onto the processor bus only at the rising edge of the external clock when it is in synchronization with the internal clock.

Figure 8:
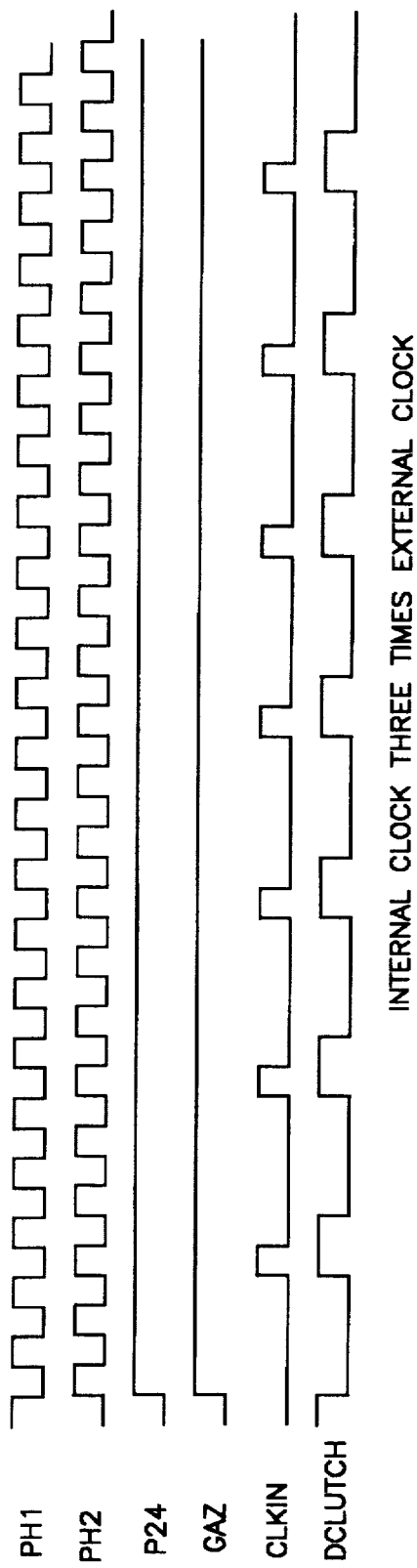
FIG. 8 is a timing diagram illustrating signals utilized in the operation of the present invention.

Like the operation of the circuit 50 at twice the rate of the external clock, when the internal clock rate of the processor 11 is three times the value of the external clock rate, the high value of the external GAZ signal enables the AND gate 57 so that it transfers whatever is produced at the output of the D latch 54. The D latch 54 produces an output signal which is identical to the output of the D latch 51 but one full internal clock period later. This value is furnished to the NOR gate 58. The NOR gate 58 produces a one input value to latch 52 only when zero values have propagated into latches 51 and 52 thereby producing a sequence of "one, zero, zero, one, zero, zero." The input DCALIGN signal is thus low at the rising edge of the external clock when the phase 2 internal clock is high, remains in this condition for another one-half of the internal clock, and then goes high for one full internal clock period. Again, this value is furnished to the latch 55 to produce a DClutch signal as illustrated in FIG. 8 which provides a window in which addresses may be transferred to the processor bus only during every third internal clock period synchronized to the rising edge of the external clock.

Figure 6:
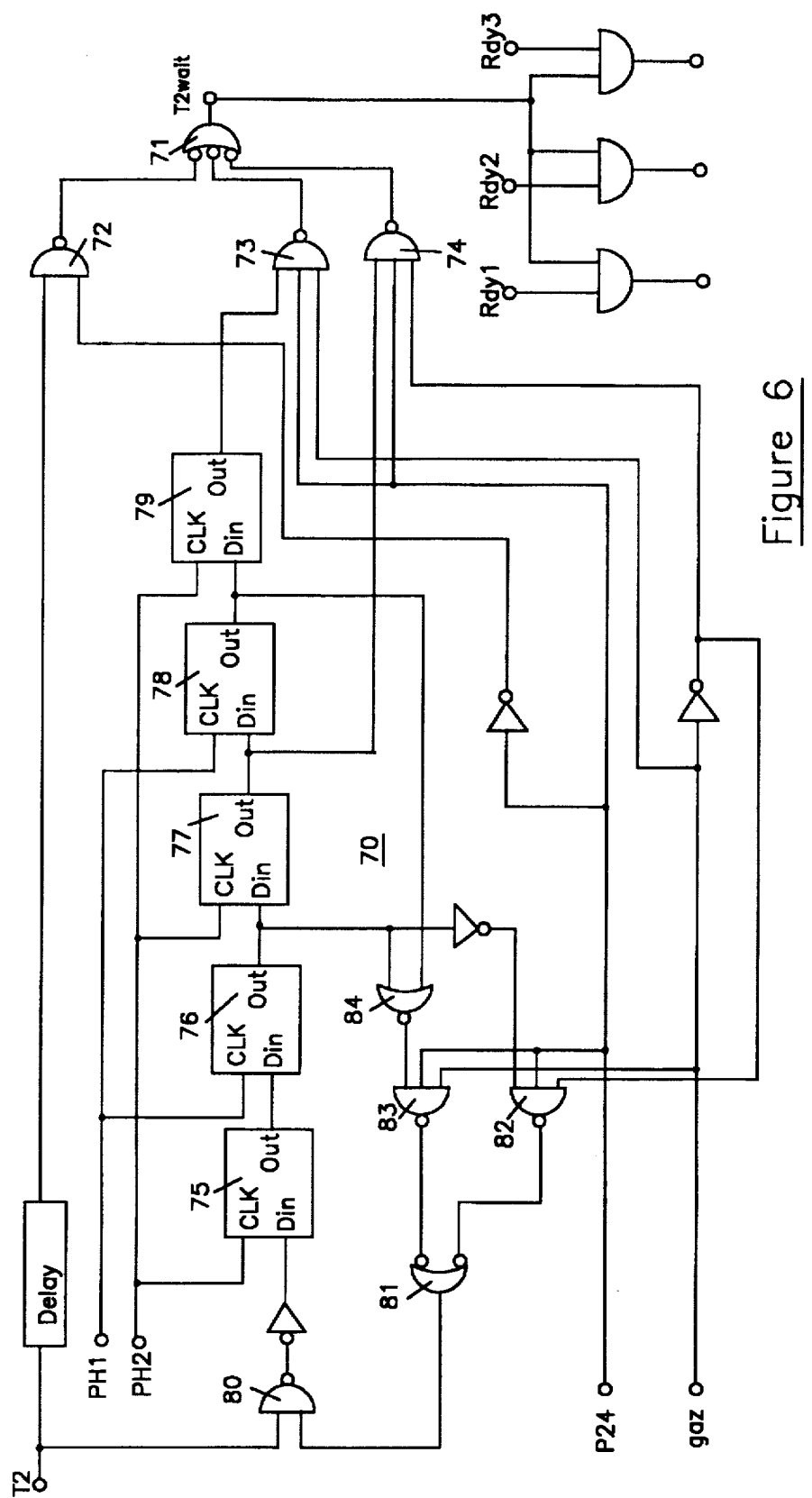
FIG. 6 is a circuit diagram illustrating details of circuitry for providing certain of the signals illustrated in the state diagram of FIG. 3.

FIG. 6 is a circuit diagram illustrating details of the circuitry 70 used in the state machine of the present invention for producing the T2wait signals which mask the receipt of ready signals returned during read operations on the external bus to occur in synchronization with the external clock and the frequency of the external clock whether the internal clock is functioning at twice or three times the external clock rate. These ready signals are masked by the T2wait signals so that they may be received only during the second cycle of an internal clock which is twice the external clock or during the third cycle of an internal clock which is three times the external clock.

The circuit 70 includes an output OR gate 71 which transfers one of the three signals received at its input as the T2wait signal. A first of these signals is furnished by NAND gate 72. The NAND gate 72 receives a delayed T2 signal generated when the T2 state begins (at the coincidence of the rising edge of the external clock and the rising edge of the internal phase 2 clock) and an inverted P24 signal. Whenever the processor 11 is operating at the same clock frequency as the external circuitry, the P24 signal is low and the input to the gate 72 is high. This thus inverts the delayed T2 signal and provides one input which is inverted and provided to the OR gate 71 to produce the T2wait signal. This signal is produced when the circuit is functioning at the same rate as the external processor.

If the internal processor rate is three times the external rate, a NAND gate 73 which receives a high value from the P24 input signal and a high value from the GAZ signal to transfer the value at the output of a D latch 79 to be inverted and transferred by the OR gate 71 as the T2wait signal. The output of the latch 79 is delayed by five internal half clock periods from the input to a D latch 75. The latch 75 receives input from a NAND gate 80 which receives the T2 signal in synchronization which the transfer to the T2 state at the coincidence of the rising edge of the external clock and the rising edge of the phase 2 internal clock. Thus the output of the latch 79 is appropriately matched to provide a mask which opens to allow readies to be received during the third clock period after the beginning of the external clock.

A NAND gate 74 receives a high value from the P24 input signal and a high value from the inverted GAZ signal and thus transfers the value at the output of a D latch 77 to be inverted and transferred by the OR gate 71 as the T2wait signal. The output of the latch 77 is delayed by three internal half clocks from the input to a D latch 75 and is thus appropriately matched to provide a mask which opens to allow readies to be received during the second clock period after the beginning of the external clock.

Input to the latch 75 is provided by a NAND gate 80 which receives the T2 signal at one input terminal. The other terminal receives the output of an OR gate 81. The gate 81 receives inverted inputs which are the outputs of a NAND gate 82 and another NAND gate 83. The NAND gate 82 receives the inverted GAZ signal, the P24 signal, and an inverted output from a D latch 76. The NAND gate 82 thus transfers the inverse of the signals appearing at the output of a D latch 76 when the processor 11 is operating at a clock rate which is twice the external clock rate. The NAND gate 83 receives the GAZ signal, the P24 signal, and the output of a NOR gate 84. The gate 84 receives an output from the D latch 76 and an output one internal clock period of delay later at the output of a D latch 78. The NOR gate 84 (like the NOR gate 58 or FIG. 5) thus transfers the inverse of any one (high) valued signals appearing at its input to the input of the NAND gate 83.

Figure 9:
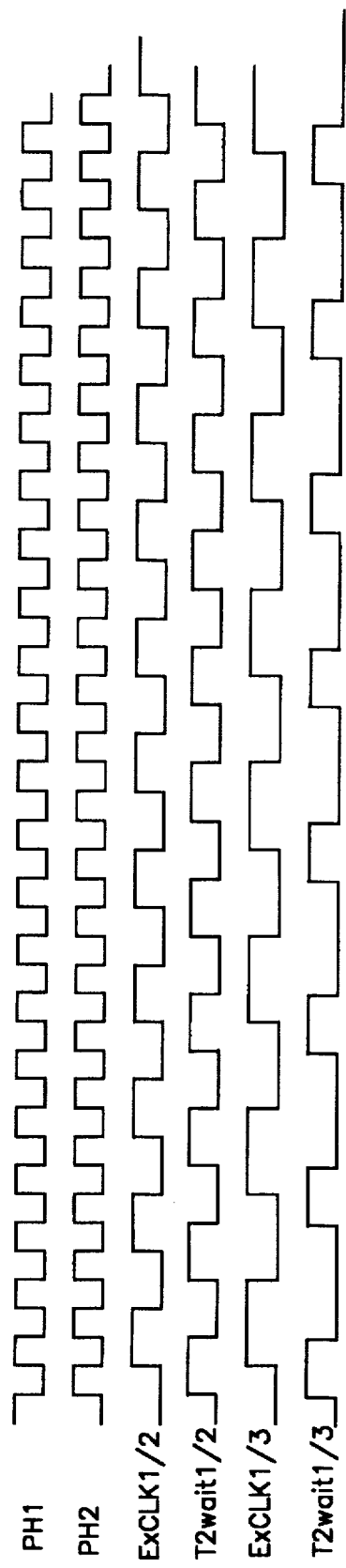
FIG. 9 is another timing diagram illustrating signals utilized in the operation of the present invention.

The T2wait signal is transferred to a series of three AND gates 85, 86, and 87 to allow the transfer of the ready signals to the processor 11 only at the appropriate unmasked portion of the internal clock. As may be seen from the timing diagram of FIG. 9, these signals are accepted only at the end of the external clock, in the second clock period of an internal clock which is twice the external clock or in the third clock period of an internal clock which is three times the external clock.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a microprocessor including a core, a core clock signal, a new address request signal, and a bus clock signal synchronized to an external clock signal, the bus clock signal having a bus clock frequency, the core clock signal having a core clock frequency of three times the bus clock frequency, a bus interface unit comprising:

a delay circuit with a plurality of stages, the delay circuit providing a delay of at least two core clock cycles of the core clock signal;

a synchronizing circuit resetting one of the plurality of stages of the delay circuit upon the coincidence of the bus clock signal and the core clock signal;

a selection circuit selectively coupled to at least one of the plurality of stages of the delay circuit, a selection circuit output being a request mask signal; and a state machine with an address state activated responsive to the new address request signal and the request mask signal, the address state being active for a first, second, and third core clock cycle of the core clock signal during a first bus clock cycle of the bus clock signal, the state machine operating using the core clock signal, and the address state including a first, second, and third address substate, the first, second, and third address substates being activated during the address state.

2. The bus interface unit of claim 1 wherein the plurality of stages of the delay circuit comprises four latches each having a latch delay of one half of one core clock cycle of the core clock signal.

3. The bus interface unit of claim 2 wherein the state machine includes a data state, the bus interface unit further comprising:

a ready input; and a ready masking circuit, enabled responsive to activation of the data state and masking the ready input for two core clock cycles of the core clock signal per bus clock cycle of the bus clock signal.

4. In a microprocessor including a core, a core clock signal, a new address request signal, and a bus clock signal operating at a bus frequency, the bus clock signal being synchronized to an external clock signal, a bus interface unit comprising:

at least one clock multiplier signal indicating either of twice the bus frequency and three times the bus frequency;

a synchronization circuit coupled to receive the bus clock signal, the core clock signal, and the at least one clock multiplier signal, the synchronization circuit providing a request mask signal inactive for a first number of either of one and two core clock cycles of the core clock signal per bus clock cycle of the bus clock signal, the first number selected according to the at least one clock multiplier signal; and a state machine with an address state, the address state being activated responsive to the new address request signal and the request mask signal, the state machine operating using the core clock signal, and the address state including a plurality of substates, a first set of substates being enabled during the address state when the at least one clock multiplier signal indicates twice the bus frequency, and a second set of substates being enabled during the address state when the at least one clock multiplier signal indicates three times the bus frequency, the state machine selectively transitioning though either of the first and second set of substates.

5. In a microprocessor including a core, a core clock signal, a new address request signal, and a bus clock signal operating at a bus frequency, the bus clock signal being synchronized to an external clock signal, a bus interface unit comprising:

at least one clock multiplier signal indicating either of twice the bus frequency and three times the bus frequency;

a synchronization circuit coupled to receive the bus clock signal, the core clock signal, and the at least one clock multiplier signal, the synchronization circuit providing a request mask signal inactive for a first number of either of one and two core clock cycles of the core clock signal per bus clock cycle of the bus clock signal, the first number selected according to the at least one clock multiplier signal; and a state machine with an address state, the address state being activated responsive to the new address request signal and the request mask signal, the state machine operating using the core clock signal and the address state including a first and second 2x mode substate, the first and second 2x mode substate being activated during the address state if the microprocessor is operating at two times the bus frequency; and a first, second, and third 3x mode substate, the first, second, and third 3x mode substate being activated during the address state if the microprocessor is operating at three times the bus frequency.

6. The bus interface unit of claim 5 wherein the synchronization circuit further comprises:

a feedback loop selectively including a plurality of core clock delay stages selected according to the at least one clock multiplier signal; and a reset circuit coupled to receive the bus clock signal, the core clock signal, and coupled to one of the core clock delay stages.

7. The bus interface unit of claim 6 wherein the state machine includes a data state, the bus interface unit further comprising:

a ready input; and a ready masking circuit, enabled responsive to activation of the data state and masking the ready input for the first number of core clock cycles.

8. In a microprocessor including a core, a core clock signal, a new address request signal, and a bus clock signal operating at a bus frequency, the bus clock signal being synchronized to an external clock, a bus interface unit comprising:

at least one clock multiplier signal indicating either of the bus frequency, twice the bus frequency, and three times the bus frequency;

a synchronization circuit coupled to receive the bus clock signal, the core clock signal, and the at least one clock multiplier signal, the synchronization circuit providing a request mask signal inactive for a first number of either of zero, one, and two core clock cycles of the core clock signal per bus clock cycle of the bus clock signal, the first number selected according to the at least one clock multiplier signal;

a state machine with an address state, the address state being activated responsive to the new address request signal and the request mask signal, the state machine operating using the core clock signal, and the address state including a plurality of substates, the state machine selectively transitioning to substates according to the at least one clock multiplier signal.

9. The bus interface unit of claim 8 wherein the plurality of substates comprises:

a 1x mode substate being activated during the address state if the microprocessor is operating at the bus frequency;

a first and second 2x mode substate, the first and second 2x mode substate being activated during the address state if the microprocessor is operating at two times the bus frequency; and a first, second, and third 3x mode substate, the first, second, and third 3x mode substate being activated during the address state if the microprocessor is operating at three times the bus frequency.

10. The bus interface unit of claim 8 wherein the synchronization circuit further comprises:

a feedback loop selectively including a plurality of core clock delay stages selected according to the at least one clock multiplier signal; and a reset circuit coupled to receive the bus clock signal, the core clock signal, and coupled to one of the core clock delay stages.

11. The bus interface unit of claim 10 wherein the state machine includes a data state, the bus interface unit further comprising:

a ready input; and a ready masking circuit, enabled responsive to activation of the data state and masking the ready input for the first number of core clock cycles.

12. A method for synchronizing a bus with a bus clock signal operating at a bus frequency to a microprocessor with a core clock signal operating at a core frequency of three times the bus frequency, comprising the steps of:

receiving a first signal requesting a bus cycle having an address state;

asserting a second signal to mask the first signal when the bus clock signal is unaligned with respect to the core clock signal;

waiting until the bus clock signal is aligned with the core clock signal; and transitioning through a first, a second, and a third address substate during the address state.

13. The method of claim 12 further comprising the steps of:

transitioning to a data state;

masking a ready signal during two internal clock periods in which the bus clock signal and the core clock signal are not synchronized;

leaving the data state in response to an unmasked ready signal.

14. A method for synchronizing a bus with a bus clock signal operating at a bus frequency to a microprocessor having a core with a core clock signal operating at either of a first core frequency ratio of two times the bus frequency and a second core frequency ratio of three times the bus frequency, comprising the steps of:

receiving a first signal requesting a bus cycle having an address state;

asserting a second signal to mask the first signal when the bus clock signal is unaligned with respect to the core clock signal;

waiting until the bus clock signal is aligned with the core clock signal;

executing two state transitions for the address state if the microprocessor is operating at the first core frequency ratio; and executing three state transitions for the address state if the microprocessor is operating at the second core frequency ratio.

15. The method of claim 14 further comprising the steps of:

transitioning to a data state;

masking a ready signal during one internal clock period of the core clock signal in which the bus and the core are not synchronized if the microprocessor is operating at the first core frequency ratio;

masking a ready signal during two internal clock periods of the core clock signal in which the bus and the core are not synchronized if the microprocessor is operating at the second core frequency ratio;

leaving the data state in response to an unmasked ready signal.

16. In a microprocessor including a core, a core clock signal operating at a core clock frequency, a bus clock signal operating at a bus frequency, a bus interface unit comprising:

delay means providing a delay of at least two core clock cycles of the core clock signal to retain synchronization of a request mask signal which is synchronized to the bus clock signal, the core clock frequency being three times the bus frequency;

synchronization means coupled to the core clock signal, the delay means, and the bus clock signal for resetting a stage of the delay means and synchronizing the request mask signal;

logic means for transitioning to an address state using the request mask signal, the address state being active for a cycle of the bus clock signal, the logic means further providing a data state:

a ready input; and masking means for masking the ready input for two core clock cycles of the core clock signal during the data state.

17. In a microprocessor including a core, a core clock signal, a bus clock signal operating at a bus frequency, and a new address request signal, a bus interface unit comprising:

clock multiplier indication means for indicating either of twice the bus frequency and three times the bus frequency;

alignment means for providing a request mask signal which is synchronized to the bus clock signal and is inactive for a number of either of one and two core clock cycles of the core clock signal per bus clock cycle of the bus clock signal, the number selected according to the clock multiplier indication means; and logic means using the request mask signal and the new address request signal for providing an address state active for a cycle of the bus clock signal.

18. The bus interface unit of claim 17 wherein the logic means further provides a data state, the bus interface unit further comprising:

a ready input; and masking means for masking the ready input for the first number of core clock cycles of the core clock signal during the data state responsive to the clock multiplier indication means.

19. A computer system comprising:

a main memory;

a system clock signal with a system clock frequency;

a system bus operating at the system clock frequency, the main memory coupled to the system bus; and a microprocessor core having a core clock signal, the core clock signal having a core clock frequency of three times the system clock frequency; and a microprocessor bus interface coupling the microprocessor core to the system bus, the microprocessor bus interface including a new address request signal, a bus clock signal synchronized to the system clock signal, the bus clock signal having a bus clock frequency, a delay circuit with a plurality of stages, the delay circuit providing a delay of at least two core clock cycles of the core clock signal, a synchronizing circuit resetting one of the plurality of stages of the delay circuit upon the coincidence of the bus clock signal and the core clock signal, a selection circuit selectively coupled to at least one of the plurality of stages of the delay circuit, a selection circuit output being a request mask signal, and a state machine with an address state activated responsive to the new address request signal and the request mask signal, the address state being active for a first, second, and third core clock cycle of the core clock signal during a first bus clock cycle of the bus clock signal.

20. The computer system of claim 19 wherein the state machine operates using the core clock signal and the address state further comprises:

a first, second, and third address substate, the first, second, and third address substates being activated during the address state.

21. The computer system of claim 20 wherein the plurality of delay stages comprises four latches each having a delay of one half of one core clock cycle of the core clock signal.

22. The computer system of claim 20 wherein the state machine includes a data state and the microprocessor bus interface further comprises:

a ready input; and a ready masking circuit, enabled responsive to activation of the data state and masking the ready input for two core clock cycles of the core clock signal per bus clock cycle of the bus clock signal.

23. A computer system comprising:

a main memory;

a system clock signal with a system clock frequency;

a system bus operating at the system clock frequency, the main memory coupled to the system bus;

a microprocessor core including a core clock signal; and a microprocessor bus interface coupling the microprocessor core to the system bus, the microprocessor bus interface including a new address request signal, a bus clock signal operating at a bus frequency, the bus clock signal being synchronized to the system clock signal, at least one clock multiplier signal indicating either of twice the bus frequency and three times the bus frequency, a synchronization circuit coupled to receive the bus clock signal, the core clock signal, and the at least one clock multiplier signal, the synchronization circuit providing a request mask signal inactive for a first number of either of one and two core clock cycles of the core clock signal per bus clock cycle of the bus clock signal, the first number selected according to the at least one clock multiplier signal, and a state machine with an address state, the address state being activated responsive to the new address request signal and the request mask signal, the state machine operating using the core clock signal, and the address state including a plurality of substates, a first set of substates being enabled during the address state when the at least one clock multiplier signal indicates twice the bus frequency and a second set of substates being enabled during the address state when the at least one clock multiplier signal indicates three times the bus frequency, the state machine selectively transitioning through either of the first and second set of substates.

24. The computer system of claim 23 wherein the first set of substates comprises a first and second 2x mode substate, the first and second 2x mode substate being activated during the address state if the microprocessor core is operating at two times the bus frequency, and the second set of substates comprises a first, second, and third 3x mode substate, the first, second, and third 3x mode substate being activated during the address state if the microprocessor core is operating at three times the bus frequency.

25. The computer system of claim 24 wherein the synchronization circuit further comprises:

a feedback loop selectively including a plurality of core clock delay stages selected according to the at least one clock multiplier signal; and a reset circuit coupled to receive the bus clock signal, the core clock signal, and coupled to one of the core clock delay stages.

26. The computer system of claim 25 wherein the state machine includes a data state, and the microprocessor bus interface further comprises:

a ready input; and a ready masking circuit, enabled responsive to activation of the data state and masking the ready input for the first number of clock cycles of the core clock signal per bus clock cycle of the bus clock signal.

27. A computer system comprising:

a main memory;

a system clock signal with a system clock frequency;

a system bus operating at the system clock frequency, the main memory coupled to the system bus;

a microprocessor core including a core clock signal; and a microprocessor bus interface coupling the microprocessor core to the system bus, the microprocessor bus interface including a new address request signal, a bus clock signal operating at a bus frequency, the bus clock signal being synchronized to the system clock signal, at least one clock multiplier signal indicating either of the bus frequency, twice the bus frequency, and three times the bus frequency, a synchronization circuit coupled to receive the bus clock signal, the core clock signal, and the at least one clock multiplier signal, the synchronization circuit providing a request mask signal inactive for a first number of either of zero, one, or two core clock cycles of the core clock signal per bus clock cycle of the bus clock signal, the first number selected according to the at least one clock multiplier signal, and a state machine with an address state, the address state being activated responsive to the new address request signal and the request mask signal, the state machine operating using the core clock signal, and the address state including a plurality of substates, the state machine selectively transitioning to substates according to the at least one clock multiplier signal.

28. The computer system of claim 27 wherein the plurality of substates comprises:

a 1x mode substate being activated during the address state if the microprocessor core is operating at the bus frequency;

a first and second 2x mode substate, the first and second 2x mode substate being activated during the address state if the microprocessor core is operating at two times the bus frequency; and a first, second, and third 3x mode substate, the first, second, and third 3x mode substate being activated during the address state if the microprocessor core is operating at three times the bus frequency.

29. The computer system of claim 28 wherein the synchronization circuit further comprises:

a feedback loop selectively including a plurality of core clock delay stages selected according to the at least one clock multiplier signal; and a reset circuit coupled to receive the bus clock signal, the core clock signal and coupled to one of the core clock delay stages.

30. The computer system of claim 29 wherein the state machine includes a data state, and the microprocessor bus interface further comprises:

a ready input; and a ready masking circuit, enabled responsive to activation of the data state and masking the ready input for the first number of core clock cycles of the core clock signal per bus clock cycle of the bus clock signal.

31. A method for synchronizing a computer system bus with a system clock signal having a system clock frequency to a microprocessor with a bus clock signal synchronized to the system clock signal and a core clock signal operating at a core frequency of three times the system clock frequency, comprising the steps of:

receiving a first signal requesting a bus cycle with an address state;

asserting a second signal to mask the first signal when the bus clock signal is unaligned with respect to the core clock signal;

waiting until the bus clock signal is aligned with the core clock signal; and transitioning through a first, a second, and a third address substate during the address state.

32. The method of claim 31 further comprising the steps of:

transitioning to a data state;

masking a ready signal during two internal clock periods in which the bus clock signal and the core clock signal are not synchronized; and leaving the data state in response to an unmasked ready signal.

33. A method for synchronizing a computer system bus with a system clock signal having a system clock frequency to a microprocessor with a bus clock signal synchronized to the system clock signal and a core clock signal operating at either of a first system clock multiplier ratio of two times the system clock frequency and a second system clock multiplier ratio of three times the system clock frequency, comprising the steps of:

receiving a first signal requesting a bus cycle with an address state;

asserting a second signal to mask the first signal when the bus clock signal is unaligned with respect to the core clock signal;

waiting until the bus clock signal is aligned with the core clock signal;

executing two state transitions for the address state if the microprocessor is operating at the first system clock multiplier ratio; and executing three state transitions for the address state if the microprocessor is operating at the second system clock multiplier ratio.

34. The method of claim 33 further comprising the steps of:

transitioning to a data state;

masking a ready signal during one internal clock period in which the bus clock signal and the core clock signal are not synchronized if the microprocessor is operating at the first system clock multiplier ratio;

masking a ready signal during two internal clock periods in which the bus clock signal and the core clock signal are not synchronized if the microprocessor is operating at the second system clock multiplier ratio;

leaving the data state in response to an unmasked ready signal.

35. A computer system comprising:

main memory means;

clock means for providing a system clock with a system clock frequency;

system bus means, the main memory means being coupled to the system bus means;

a microprocessor core including a core, a core clock signal operating at a core clock frequency, the core clock frequency being three times the system clock frequency; and a microprocessor bus interface coupling the microprocessor core to the system bus means, the microprocessor bus interface including a bus clock signal operating at the system clock frequency, delay means providing a delay of at least two core clock cycles of the core clock signal to retain synchronization of a request mask signal which is synchronized to the bus clock signal, synchronization means coupled to the core clock signal, the delay means, and the bus clock signal for resetting a stage of the delay means and synchronizing the request mask signal, and logic means for transitioning to an address state using the request mask signal, the address state being active for a cycle of the bus clock signal.

36. The computer system of claim 35 wherein the logic means further provides a data state, and the microprocessor bus interface further comprises:

a ready input; and masking means for masking the ready input for two core clock cycles of the core clock signal during the data state.

37. A computer system comprising:

main memory means;

clock means for providing a system clock signal with a system clock frequency;

system bus means, the main memory means being coupled to the system bus means;

a microprocessor core including a core, a core clock signal operating at a core clock frequency; and a microprocessor bus interface coupling the microprocessor core to the system bus means, the microprocessor bus interface including a bus clock signal operating at the system clock frequency, clock multiplier indication means for indicating a either of twice the system clock frequency and three times the system clock frequency, alignment means for providing a request mask signal which is synchronized to the system clock signal and is inactive for a first number of either of one and two core clock cycles of the core clock signal per system clock cycle of the system clock signal, the first number selected according to the clock multiplier indication means, and logic means using the request mask signal and a new address request signal for providing an address state active for a cycle of the bus clock signal.

38. The computer system of claim 61 wherein the logic means further provides a data state and the microprocessor bus interface further comprises:

a ready input; and masking means for masking the ready input the first number of core clock cycles of the core clock signal during the data state responsive to the clock multiplier indication means.

\* \* \* \* \*

UNITED STATES PATENT AND TRADEMARK OFFICE
CERTIFICATE OF CORRECTION

PATENT NO. : 5,537,582
DATED : July 16, 1996
INVENTOR(S) : Draeger

It is certified that error appears in the above-indentified patent and that said Letters Patent is hereby corrected as shown below:

In column 6, at line 2, insert --inverted-- between "The" and "P24".

In column 7, at line 2, delete "secT1b" and substitute --seeT1b--.

In column 7, at line 4, delete "sect 1 b" and substitute --seeT1b--.

In column 7, at line 7, delete "secT1 " and substitute --seeT1 --.

In column 13, at line 27, delete "claim 8" and substitute --claim 9--.

In column 20, at line 5, delete "claim 61" and substitute --claim 37--.

Signed and Sealed this

Tenth Day of December, 1996

Attest:

BRUCE LEHMAN

Attesting Officer     Commissioner of Patents and Trademarks